(12) United States Patent
Muscat-Tyler et al.

(10) Patent No.: US 8,525,067 B2
(45) Date of Patent: Sep. 3, 2013

(54) PROCESS OF JET CUTTING ARCUATE OPENINGS

(76) Inventors: Robin Muscat-Tyler, Hamilton (CA); Paul J. Kwiatkowski, Hamilton (CA)

( * ) Notice: Subject to any disclaimer, the term of this patent is extended or adjusted under 35 U.S.C. 154(b) by 50 days.

(21) Appl. No.: 13/067,268

(22) Filed: May 20, 2011

(65) Prior Publication Data

US 2011/0290767 A1 Dec. 1, 2011

Related U.S. Application Data

(60) Provisional application No. 61/344,127, filed on May 27, 2010.

(51) Int. Cl.
*B23K 10/00* (2006.01)

(52) U.S. Cl.
USPC .............. 219/121.44; 219/121.39; 219/121.5; 219/121.59; 219/121.54

(58) Field of Classification Search
CPC ...................................................... B23K 10/00
USPC ............ 219/121.39, 121.44, 121.59, 121.48, 219/121.5, 121.51, 75
See application file for complete search history.

(56) References Cited

U.S. PATENT DOCUMENTS

| | | | | |
|---|---|---|---|---|
| 3,813,510 A | * | 5/1974 | Hatch | 219/121.36 |
| 4,356,043 A | * | 10/1982 | Anderson et al. | 148/196 |
| 6,222,154 B1 | * | 4/2001 | Yamaguchi et al. | 219/121.39 |
| 6,705,921 B1 | | 3/2004 | Shepherd | |
| 6,922,605 B1 | | 7/2005 | Olsen | |
| 7,087,855 B2 | * | 8/2006 | Yamaguchi et al. | 219/121.39 |
| 2003/0065424 A1 | * | 4/2003 | Erichsen et al. | 700/281 |

* cited by examiner

*Primary Examiner* — Mark Paschall (57) ABSTRACT

A process for the jet cutting of arcuate openings in a metal workpiece such as steel, by means of creating a jet along a predetermined axis, applying the jet to the workpiece, with the axis of the jet offset from the perpendicular, and rotating the jet around to describe the arc desired while maintaining the non perpendicular axis and terminating the cutting path just prior to completion of the opening.

10 Claims, 14 Drawing Sheets

Prior Art

| Hole Diameter to Material Thickness Ratio | Tilt Angle degrees from vertical | Speed | Total Degrees from | Torch Compensates for Kerf Width and Plasma Unit Shuts Off |
|---|---|---|---|---|
| 1.75 | 0.5 | 100% | | -14 |
| 1.5 | 0.5 | 100% | | -14 |
| 1.25 | 0.75 | 100% | | -12 |
| 1 | 1.00 | 100% | | -10 |
| 0.9 | 1.50 | 90% | | -7 |
| 0.8 | 1.75 | 80% | | -5 |
| 0.7 | 2.00 | 70% | | -3 |
| 0.6 | 2.50 | 60% | | -1 |
| 0.5 | 3.00 | 50% | | 0 |
| 0.4 | 4.00 | 50% | | 0 |
| 0.3 | 5.00 | 50% | | 0 |

Prior Art

Figure 15B

PROCESS OF JET CUTTING ARCUATE OPENINGS

FIELD OF THE INVENTION

The invention relates to a process of cutting of metals such as steel to produce arcuate openings, and in particular to the cutting of circular openings with cylindrical surfaces, using plasma gas or laser cutting.

In the case of plasma arc cutting torches, specifically, the invention relates to a method for compensating for hole taper caused by the plasma arc configuration, such that while cutting holes the robotic torch tilt angle, the gas metering console unit, the movement path of the plasma arc, and the speed of the robot during the cutting phase and controlled in conjunction with one another to compensate for hole taper and surface irregularities.

BACKGROUND OF THE INVENTION

Cutting of metals such as steel by plasma gas jet or by laser, and also by water jet, is well established. Where reference is made to steel it will be understood to encompass any metals which can be jet cut by such techniques. The term jet cutting is used generically to encompass high temperature/pressure metal cutting techniques such as by plasma gas jet, or by laser cutting techniques, or water jet and the like. The term jet is used to encompass either the plasma gas jet, or a laser beam, or other cutting medium.

Jet cutting is used for making linear cuts. It is also used for making openings which may be circular and have cylindrical walls, or elongated slots with semi circular end walls. These techniques are fast and can be accurately controlled, and are generally speaking, superior to drilling such openings or cutting mechanically. However, it is known that when jet cutting openings particularly for fastenings such as bolts, through a steel work piece, the opening will preferably be circular, and must have a cylindrical wall. Even where openings are cut, which have partially arcuate surfaces, similar to slots with semi circular ends, the arcuate surfaces must be regular and even from one end to the other of the opening.

It is found that when jet cutting metal such as steel of a considerable thickness or gauge, especially when the openings are circular, they tend to be formed in a slightly frustoconical manner. In other words they are non cylindrical. This is found to be unsatisfactory when passing fastening such as bolts through such jet cut openings.

For this reason, the drilling of such openings by mechanical drills is often preferred even though it is slower and more costly.

Another problem with jet cutting of circular or arcuate openings has been that the opening is often found to have an undesirable recess or depression in the wall. This results in the wall around the opening being irregular.

In the case of plasma cutting an inert gas is blown at high speed out of a nozzle; at the same time an electrical arc is formed through that gas from the nozzle to the surface being cut, turning some of that gas to plasma. The plasma is sufficiently hot to melt the metal being cut and moves sufficiently fast to blow molten metal away, leaving a tapered channel in the workpiece known as a cut kerf.

Relative motion between the plasma torch and the workpiece allows the process to be used to effectively cut the workpiece. The plasma gas also known as the cutting gas interacts with a shield gas to cause the plasma arc to be constricted and enabling the temperature of the torch to be lowered. The two gases then flow downstream from the nozzle orifice enabling heat and mass transfer When cutting with plasma arc, the gas mixture ratio of the plasma gas and shield gas is set for proper operation and optimizing cut quality. For example, when cutting mild steel oxygen is used as the plasma gas and air as the shield gas. The plasma gas is ionized in the plasma process and exits through the nozzle orifice. The shield gas is the secondary gas in the plasma process. It surrounds the plasma arc and is used for constriction of the plasma arc width and also cools the torch. The shield gas creates the cutting environment and the edge quality.

Such cutting processes have certain limitations when cutting high quality bolt holes. For example, if a plasma arc torch is in a perpendicular position throughout the circumference of the hole, a considerable "tapered" or "beveled" cut will occur. The diameter of the bolt hole on the top side of the workpiece will be larger than the diameter of the bolt hole on the bottom side of the workpiece thus not achieving absolute cylindricity. Cylindricity in this instance is defined as a, three-dimensional geometric tolerance that controls how much a feature can deviate from a perfect extruding cylinder through the workpiece. In these types of instances, secondary processes such as burrowing or drilling and required to enlarge the diameter of the bolt hole on the bottom side of the workpiece. Secondary processes are time consuming and unconventional suggesting that a more efficient method is necessary for cutting high quality bolt holes. Furthermore, prior processes left irregularities in the interior of the bore hole, requiring further operations to reduce them.

BRIEF SUMMARY OF THE INVENTION

The invention provides a process for the jet cutting of arcuate openings in metals such as steel, by means of creating a cutting jet, such as a high temperature jet or beam, along a predetermined axis, applying the jet to the metal, with the axis of the jet offset from the perpendicular and diverging to one side, and then rotating the jet around to describe the arc desired while maintaining the non perpendicular axis.

Preferably the angle of the jet axis will vary depending on both the thickness of the metal, and the diameter of the opening.

It may also be useful to vary the intensity of the jet as the opening increases in depth. In the case of plasma jet cutting this can be achieved by varying the gas pressure.

In the case of plasma arc cutting torches, specifically, the invention relates to a method for compensating for hole taper caused by the plasma arc configuration, such that while cutting holes the robotic torch tilt angle, the gas metering console unit, the relative movement path of the plasma arc, and the speed of the robot during the cutting phase and controlled in conjunction with one another to compensate for hole taper.

In the present invention. By changing the torch angle, altering the plasma arc to gradually translate inwardly before completion of the hole, metering the current ramping sequence for arc termination, and circumstantially impeding the speed of the robot, the present invention achieves a high quality bolt hole to be cut without the wall of the hole being tapered.

The invention features, in one aspect a method of controlling the plasma torch cutting parameters such that when the perimeter of hole is breached the torch tilt angle maintains as a constant throughout completion of the hole. In some embodiments the torch tilt angle varies depending on the ratio of the diameter of the hole to the thickness of a workpiece.

In another aspect the invention features a method that includes controlling the plasma arc, such that when the selected computer readable product is processed, the computer operating system controls the composition of the plasma and shield gas flow through the gas console to terminate the plasma arc, at a preselected position prior to completion of 360 degrees of cut.

In still another aspect, the invention features a computing operating system for controlling cutting parameters of the plasma arc, whereby the composition of the plasma and shield gases are metered. Plasma and shield gases compositions are based on a table embodied in an information carrier. The computer operating system selects the compositions depending on the computer readable product.

In one embodiment the operating system includes a processor, an electronic storage device, and an interface for providing control instructions to the gas metering console for termination of the plasma arc.

In another aspect, the invention features a further method of cutting a hole in a workpiece using a plasma arc torch. The method includes the step of cutting a hole in a workpiece, wherein relative movement between the torch tip and the workpiece creates a hole pierce originating from the center point of the hole, and wherein from that starting position the plasma arc gradually leads out to the circumference of the hole with the torch at a predetermined angle. In the same embodiment, when the torch is nearing completion of the hole the plasma arc will gradually lead inwardly from the circumference towards the center of the hole according to selected operating parameters.

In another aspect, the invention features a computer operating system for controlling the cutting speed parameters which comprises embodied information passed communicatively through signals to a robotic controller, such that the cutting speed parameters are based on the relation of the diameter of the hole to material thickness. In some embodiments the cutting information includes instructions such that when a hole is cut the robotic controller may instruct different cutting speed parameters, depending on the computer readable product.

In one aspect, the plasma torch system for cutting a high quality bolt hole is used in a workpiece which includes a plasma torch including a nozzle and an electrode that define a plasma chamber. A plasma arc is generated in the plasma chamber which is used to cut an extrusion in a workpiece with a current above 50 amps. The method includes the step for cutting an extrusion in a workpiece, wherein the computer operating system governs the operating parameters through the components in the torch system setup.

Still in a further aspect, the invention features a method for using a plasma arc to cut an extrusion through a workpiece containing two concentric cylinders with the diameter measurement on the topside of the workpiece equaling the diameter on the bottom side of the workpiece. When such extrusion is cut, the bevel or taper is nonexistent, a high quality bolt hole is achieved.

In another aspect, the invention includes a computer readable product embodied in an information carrier, operable on a computer operating system for use in the plasma arc torch system setup. In one embodiment the computer readable product includes cutting information for cutting a hole from a workpiece using a plasma arc torch. The system includes instructions such that while cutting the hole all components within the torch system work in conjunction to eliminate the bevel or taper within a hole extrusion.

Another advantage of the present invention is that the need for a secondary process is eliminated. An overall part cost is reduced by circumventing the use of burrowing or drilling machines.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

DETAILED DESCRIPTION

Figure 1:
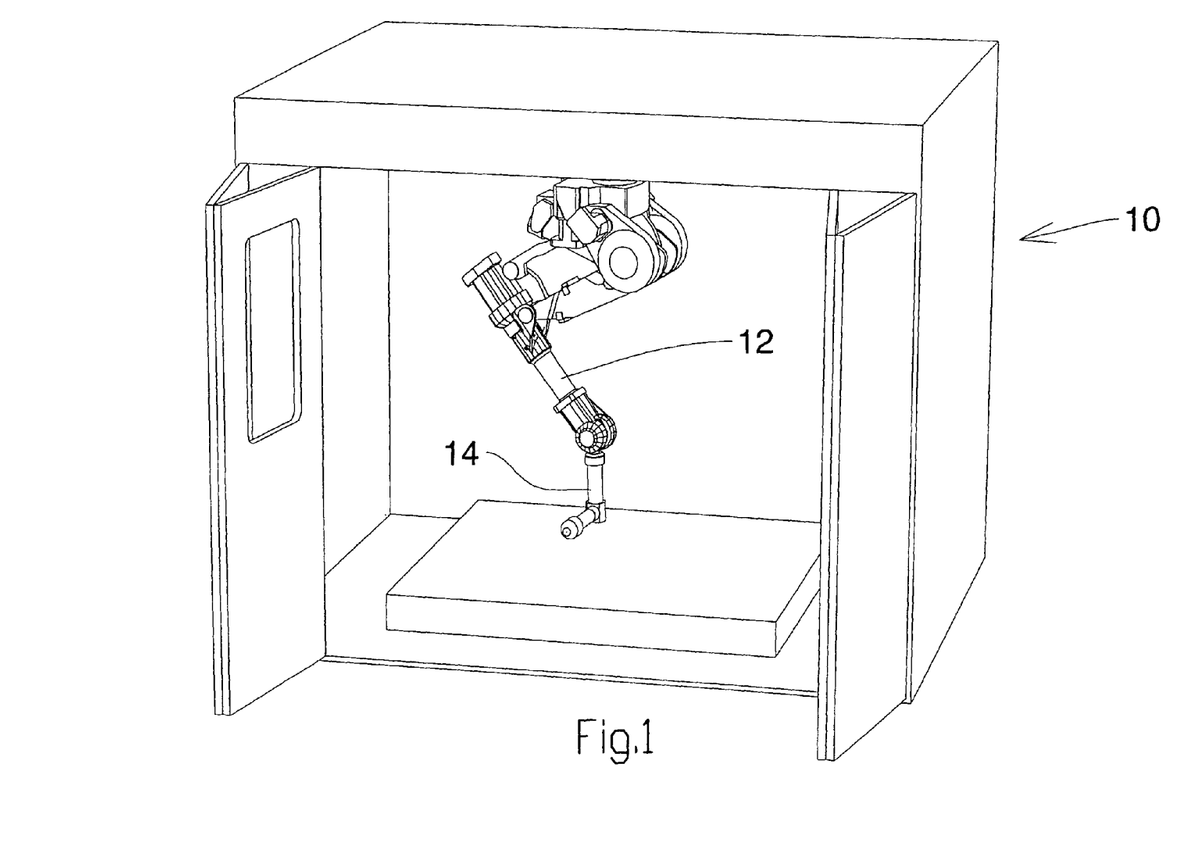
FIG. 1 is a general side elevation showing a typical jet cutting apparatus, having a robotic jet generating head.
Figure 2:
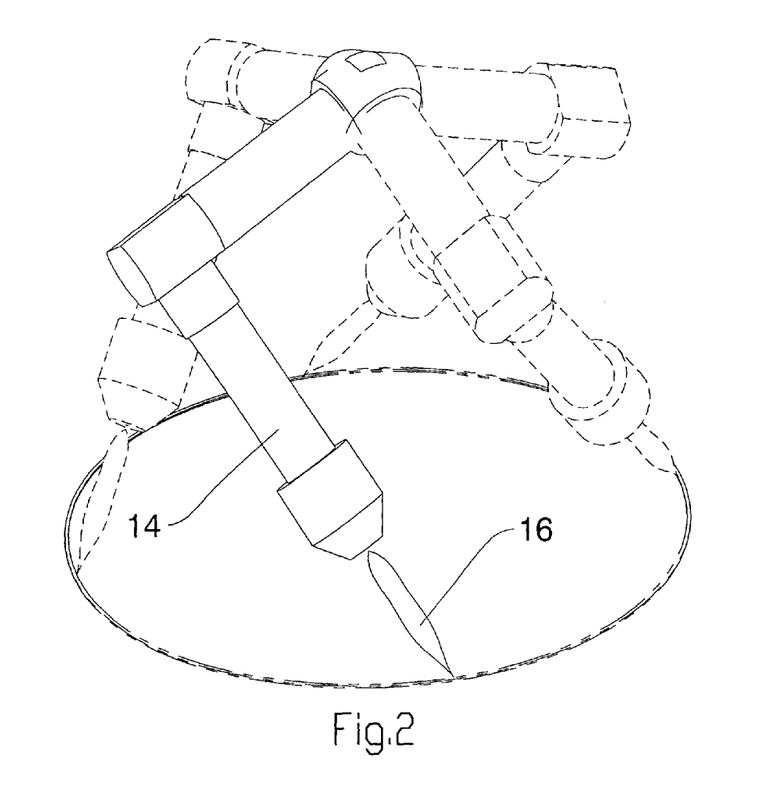
FIG. 2 is a greatly enlarged schematic perspective illustration showing a jet generating head, applied to a metal work piece, with the head moving around an arc and with the angle of the jet axis diverging from the perpendicular.
Figure 3:
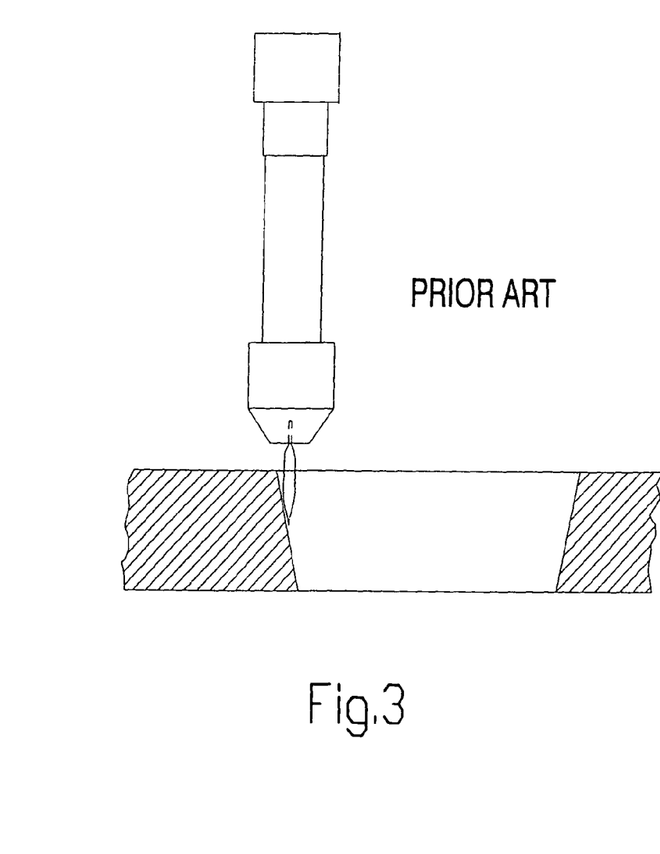
FIG. 3 is a schematic illustration, labelled PRIOR ART, showing a typical circular opening formed by prior art methods, producing a frusto-conical taper.

Referring, first of all to FIG. 3, labelled PRIOR ART, it can be seen that this figure illustrates in general terms a typical circular opening formed by jet cutting according to prior art methods. This demonstrates the non-cylindrical shape of such an opening, which can be seen to be generally frusto-conical.

The reasons for the development of the non cylindrical shape of such an opening are believed to be that the jet is at its most intense, at the point where it is emitted from the jet head, and impinges on the surface of the work piece. The jet then progressively diminishes in intensity, as distance between the interior of the hole being formed in the work piece and the jet head increases and the opening starts to become deeper in the work piece.

Figure 4:
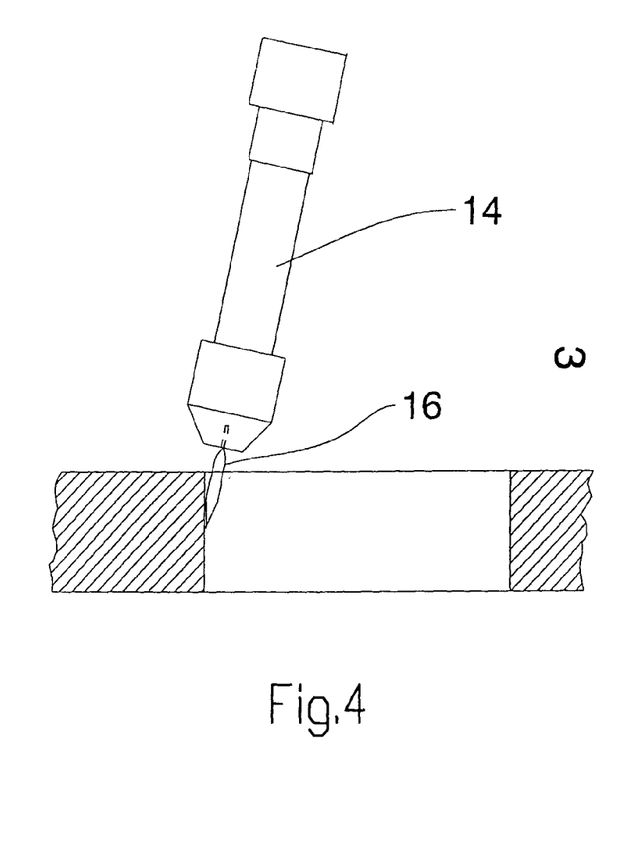
FIG. 4 is a sectional illustration of a metal work piece showing a circular opening having cylindrical surfaces formed according to the present invention.

FIG. 4 illustrates a typical circular opening formed with regular cylindrical surfaces from top to bottom, having been formed in accordance with the process of the invention. The invention provides a jet cutting cabinet, (10) through which a work piece can be moved progressively from one station to another, as each opening is completed. A jet cutter robot carriage (12) is seen depending down within the cabinet. A jet cutting torch (14) is secured on the free end of carriage (12).

Robot (12) can be moved by a series of power operated systems, such as motors, cylinders or the like, (not shown), through out a wide range of positions and movement paths.

FIG. 4 illustrates one aspect of the invention in which the jet torch (14) is angled so as to direct the jet axis (16) offset from perpendicular, the result being that the torch directs the axis (16) of the jet at an angle which is non perpendicular to the work piece.

Figure 5:
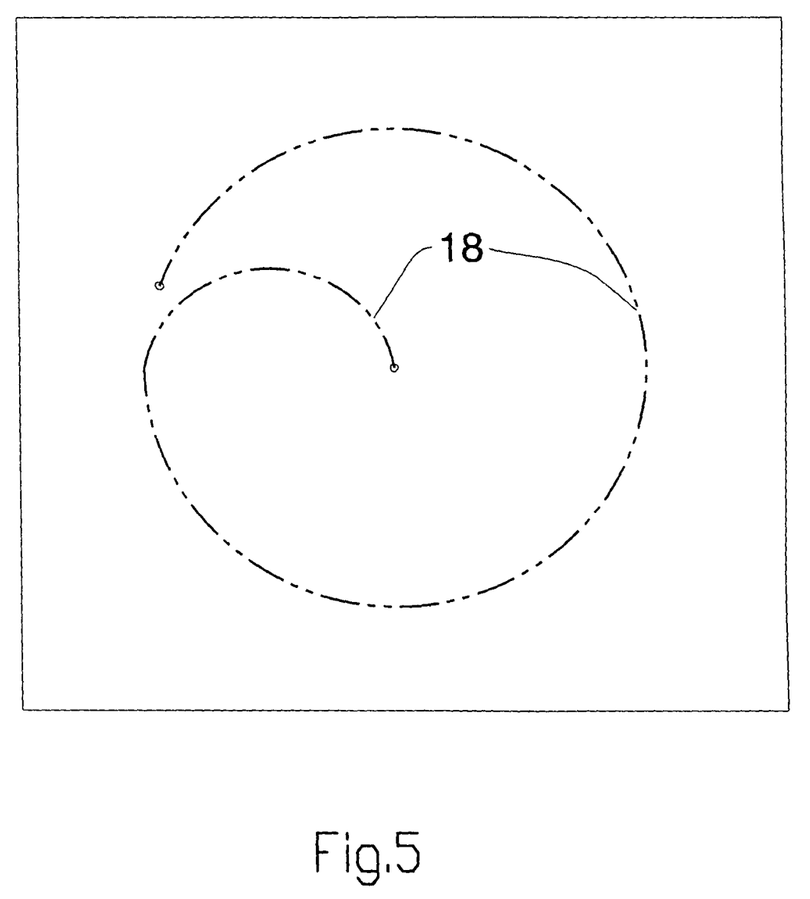
FIG. 5 is a schematic illustration showing the path of the jet on the work piece.

FIG. 5 illustrates another aspect of the invention by which the path (18) of the jet (16), when forming a circular opening is created. The jet starts at about the centre of the desired opening.

The path (18) then follows an expanding spiral arc, until it reaches the circumference of the opening. The path (18) then follows around the circumference, until it reaches a point which is just short of where it completes the circumference path. The jet is then shut off.

It is found that the residual heat in the gases emitting from the torch are sufficient to complete the opening.

This timing of the jet shut off is found to substantially eliminate the formation of undesired depressions or irregularities in the wall of the opening.

The invention is illustrated in more detail in FIGS. 6 to 14. In the present invention a plasma arc torch (20) to cut high quality bolt holes has a robotic carriage (12), a gas metering console unit (22), the cutting path and the terminating the path of the torch are all controlled by the computer operating system (26). To compensate for hole tapering, a set of protocols of operating parameters is used in different instances where the ratio of the diameter of the hole to thickness of a workpiece varies. For example, if a 1 inch thick plate mild steel (S) is used with a desired hole to be cut with a diameter of 1 inch; the material thickness to the diameter of the hole has a ratio of 1:1. A set protocol implemented into the operating system, enables correlation between the torch tilt angle (28), the gas metering console (22), the motion path of the cut and the adjusted speed of the robot to achieve a high quality bolt hole compensated for hole taper. In further relation to the previous example, a 2 inch thick plate mild steel used with a desired hole to be cut with a diameter of 1.5 inch, the material thickness to the diameter of the hole has a ratio of 0.75:1. A set protocol, different from the protocol previously mentioned is implemented by the computer operating system.

Figure 11:
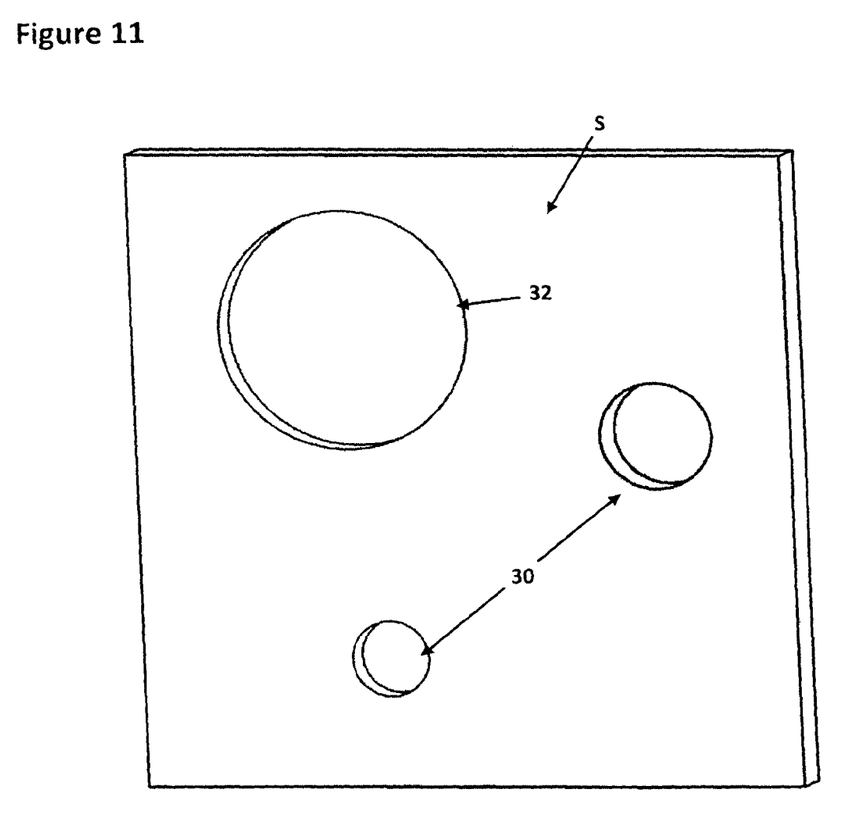
FIG. 11 is a sample workpiece showing anticipated outlines.

As used herein, a hole is a shape having a diameter to workpiece (plate) thickness ratio of approximately 1.5:1 or smaller. FIG. 11, by way of example, shows a 4×3 inch rectangular piece of 1 inch thick plate mild steel (S) that in one embodiment could be a sectional piece from a larger piece of plate mild steel. Located on the workpiece is a 1 inch diameter hole (30) in the 1 inch thick plate of mild steel (S). A hole of this configuration would have a ratio of 1:1. A 0.75 inch diameter hole (32) in the 1 inch thick plate of mild steel (S) would have a ratio of 0.75:1. A hole, as used herein, can be categorized as a small internal feature. A bolt hole with the diameter to material thickness exceeding a ratio of 1.5:1 would be considered in the embodiment of the invention, such that the same parameters shall be used as the operating parameters used with the ratio consisting of 1.5:1. In example, a 2 inch diameter hole in the 1 inch thick plate of steel (S) would have a ratio of 2:1. The ratio of 2:1 would use the same protocol operating parameters as a diameter to material thickness relation equaling a ratio of 1.5:1. Other contours besides holes could also be considered in the embodiment of the invention.

Figure 6:
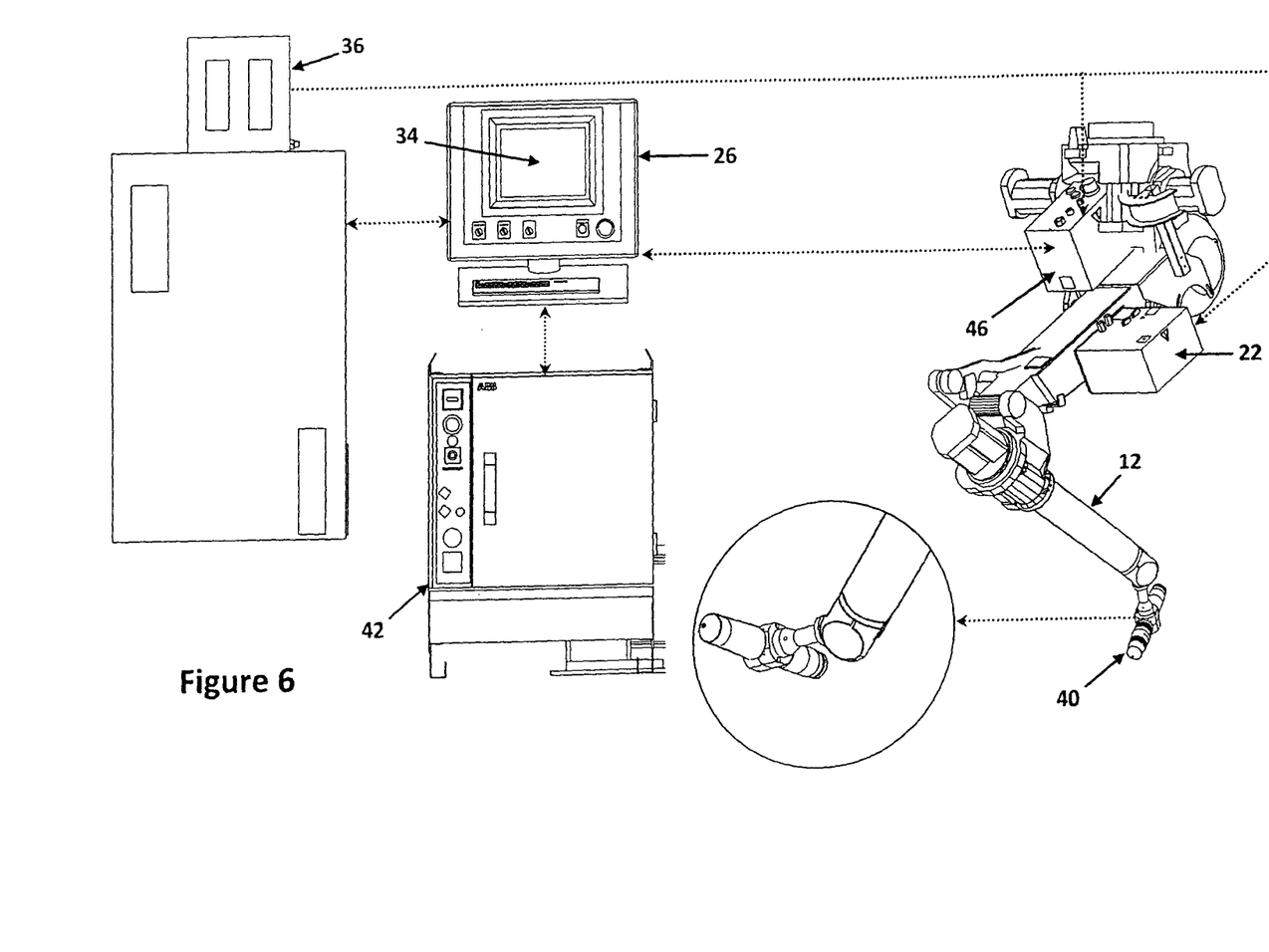
FIG. 6. Is a block diagram illustrating relationships between the components of the plasma arc torch system setup.
Figure 7:
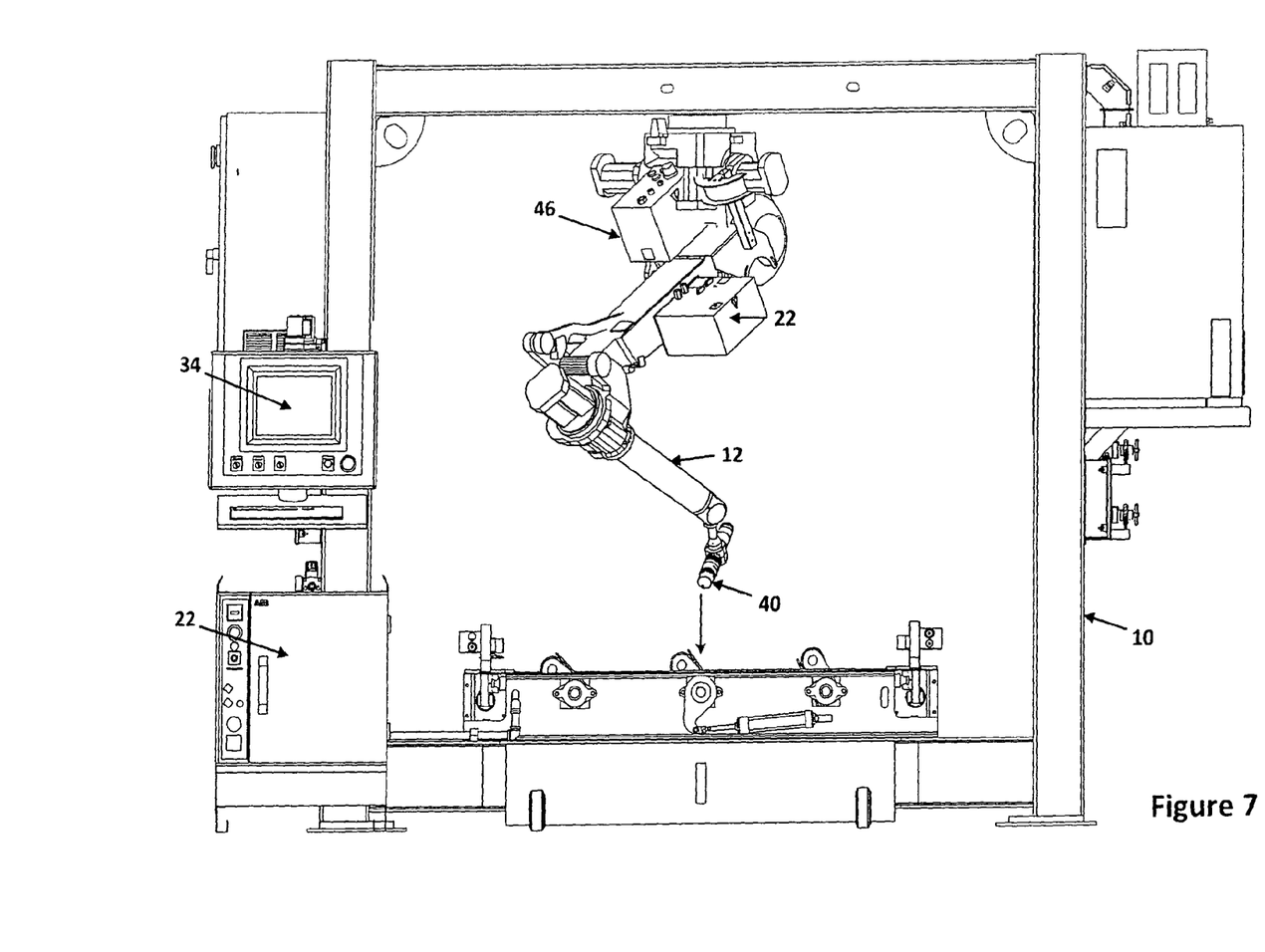
FIG. 7 is a typical plasma arc torch system setup, depicting a torch mounted to a robotic structure.

FIGS. 6 and 7 illustrate relationships between the components of the plasma arc torch system setup. A computer operating system (26) is used to interpret computer readable products which then can delegate tasks to the other components included in the block diagram. In some embodiments, the computer readable products are referred to as cut charts. In another embodiment, the computer readable product (not shown), or cut charts, contains cutting information including cutting instructions passed to other components in the torch system which configure the torch tilt angle (28), robot speed, the relative path of the torch tip around the circumference of the hole and the timing of the gas metering console (22). A drawing file containing details of the part to be processed is provided to the computer operating system (26) through a portable storage device or passed serially through an Ethernet connection. These readable instructions can be viewed through the user interface (34) by the torch operator. In some embodiments the torch operator can decide to process the drawing file. In other embodiments the torch operator can decide to manually input changes to the operating parameters. From instructions contained in the cut chart, the operating system can select the appropriate plasma gas and shield gas composition. Power supplied to the ignition console and gas console is typically at 260 amp, from 150-VDC constant-current power supply (36). Embedded in the power supply (36) is the circuitry to ignite the torch and meter the gas. The information is processed via a digital output signal through the computer operating system (26) to set the desired parameters. The ignition console (38) converts 120 VAC control voltage from the power supply (36) into high-voltage pulses. A plasma arc (40) is produced to process a workpiece (S) by the robotic structure (12), using information sent by the computer operating system (26) to the robotic controller (42).

Figure 8:
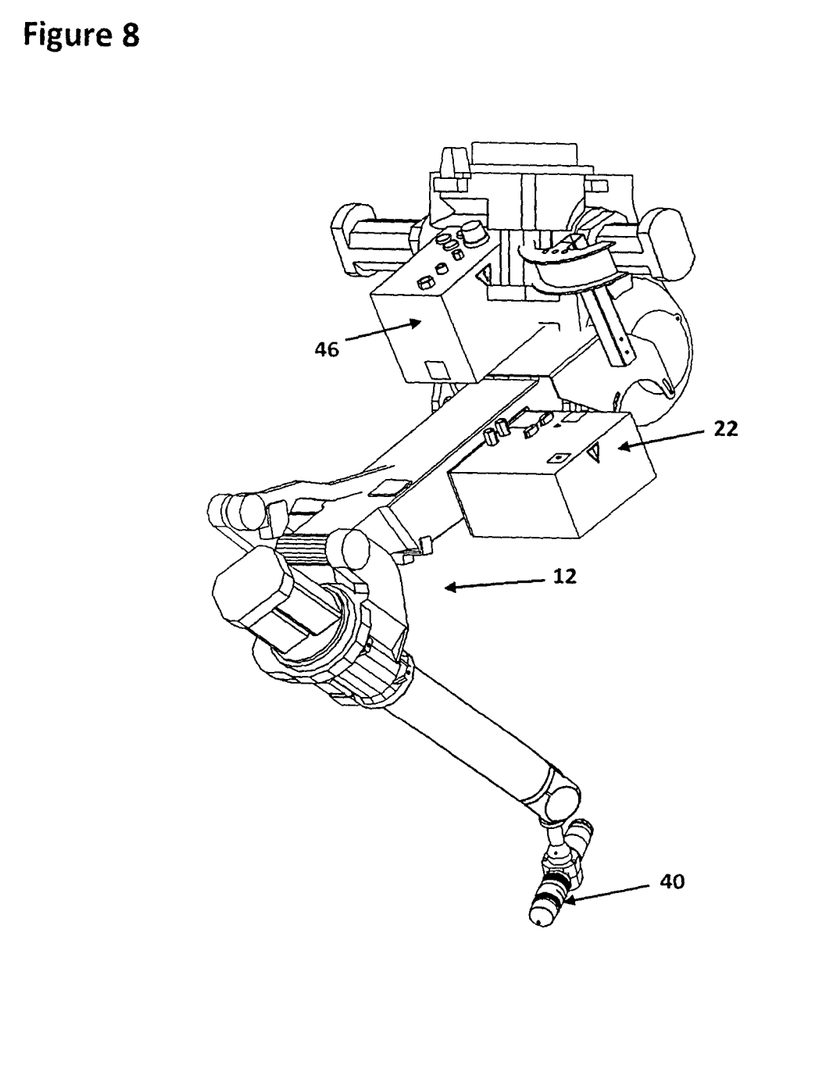
FIG. 8 is an in depth view of a typical torch setup to compensate for plasma taper.

FIG. 8 shows the robotic carriage structure (12) in more detail.

FIG. 8 shows the robotic carriage structure having the gas metering console (22) and ignition console (46). The gas metering console (22) provides sufficient plasma and shield gases to the plasma tip (40) to sustain a constant plasma arc. The ignition console (46) generates a high tension electrical spark to ignite the gas.

Figure 9A:
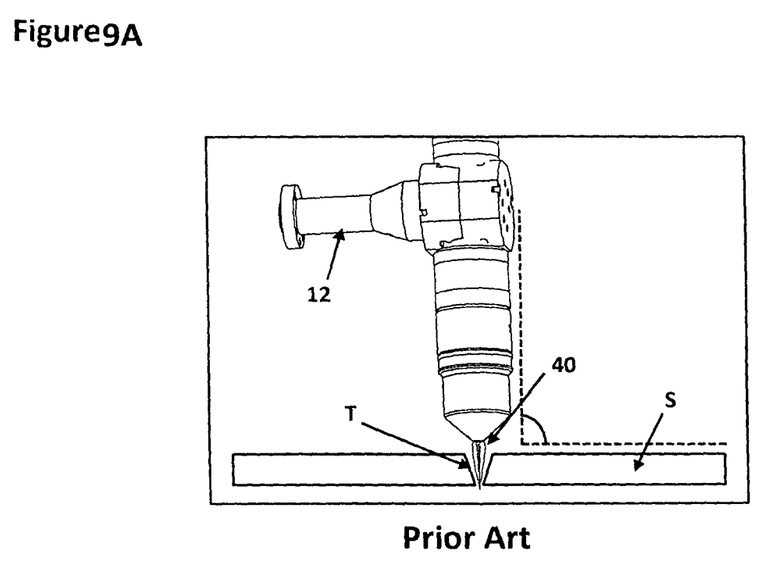
FIG. 9A (PRIOR ART) shows a plasma torch perpendicular to a work piece.
Figure 15A:
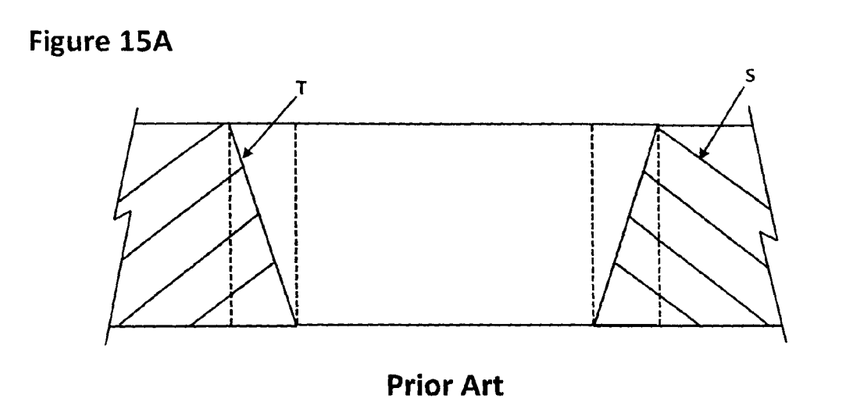
FIG. 15A is a cross sectional view of a hole cut with a typical prior art Plasma jet cutting process.

A torch system configuration that was typically used with existing conventional methods is depicted in FIGS. 9A and 15A, (PRIOR ART). The plasma tip (40) was perpendicular to the workpiece (S). This made a tapered cut when relative motion is present between the workpiece (S) and the plasma tip (40).

Figure 9B:
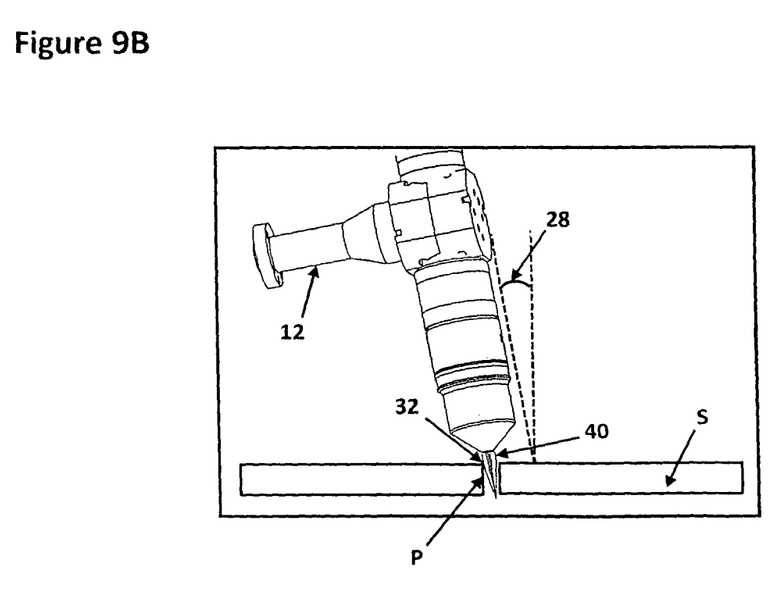
FIG. 9B shows a plasma torch at a tilt angle.

A torch system configuration that can be used with one embodiment of the invention is shown in FIGS. 9B, and 9C. The plasma torch is manipulated, such that the torch angle (28) is used to compensate for the tapered cut.

Motion of the angled plasma tip (40) around the workpiece (S) has the effect of eliminating a tapered effect in the hole in workpiece (S).

Figure 10A:
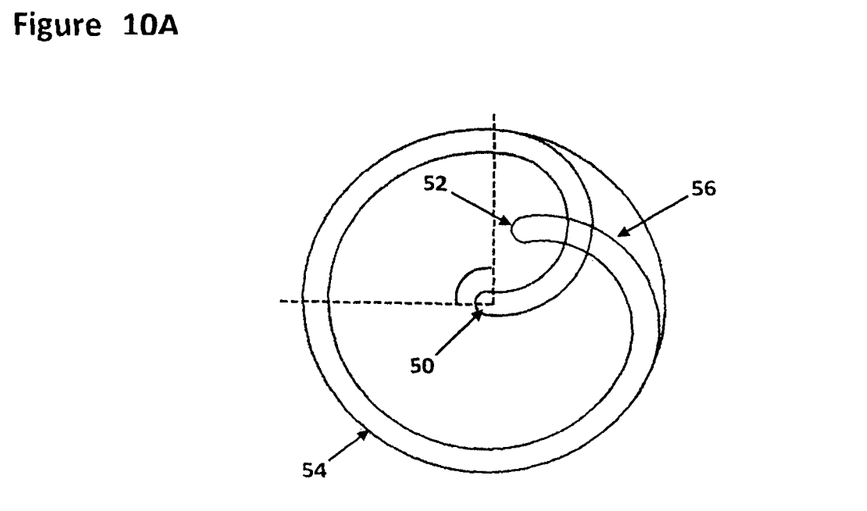
FIG. 10A illustrates the movement path during a hole cutting operation, also illustrating the torch angle compensating for taper.

FIG. 10A shows the relative motion path between the plasma torch tip of and the workpiece when a small feature is processed. The start position (50), the end position (52), and the edge (54) of the hole cut in the workpiece is shown in this figure. The torch operator selects a cutting program that includes operating parameter instructions for the specific feature to be cut. In some embodiments an operator can manually input through the user interface (34) specified operating parameters designed to execute correct tilt angles, timing of the gas metering console and controlling the cut path. The initial pierce of the workpiece will be positioned directly in the center of the hole. The ignition console (46) in correlation with the gas metering console (22) will pierce the workpiece. Then the protocol for the motion path is guided through the computer operating system (26). The motion path from centre (50) will lead out to the edge (54) of the hole and also lead in (56) to complete the hole as referred to below.

Figure 10B:
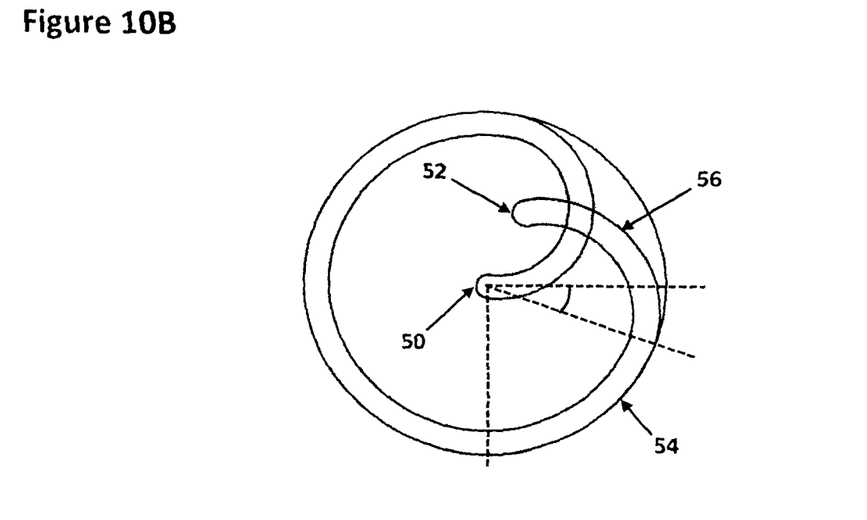
FIG. 10B shows the plasma torch at another position in the cutting path.

FIG. 10B shows the plasma arc torch (40) at the completion of the hole. The plasma torch will lead back in as at (56) and reach the end (52) of the cut before completing 360 degrees of relative motion. In example, a 1 inch thick plate mild steel (S) with a hole diameter of 1 inch, the material thickness to the diameter of the hole has a ratio of 1:1. The plasma arc torch will lead in at end (52) 10 degrees before completing 360 degrees of rotation. This feature improves cut quality by creating consistent lag lines throughout the circumference of the hole. The torch path then rotates in along an inward curve (56) and the torch is shut off. This also eliminates irregularities on the cylindrical surface of the hole.

The computer operating system (26) can be any computer that controls a plasma torch system. An operating system can have a processor, electronic storage device, input devices and a user interface (34) for providing control instructions to a plasma arc torch. The storage device can be internal or external and can load the data relating to the part to be cut in the workpiece. In other embodiments, the computer operating system (26) can be manually programmed, and in some embodiments the computer operating system (26) can include a computer readable product that includes computer readable instructions that can select or configure operating parameters of the plasma torch system.

An example of computer readable instructions is below. The instructions correspond to a round hole cut into a mild steel plate (S) workpiece using a plasma arc torch system setup according to the invention. In the exemplary code below, the code provides operating parameters to cut a hole. In some embodiments, other forms of code are used, or computer readable instructions can be used with one or more operating procedures to provide a similar, or even identical final output. The referenced code lines are listed, followed by a semi-colon and a general explanation of the instructions contained in each code line.

WorkOpFace:=Face{WorkPointCount}; Set operation face
RbtTransition; Robot moves to the operation face
tWorking:=tCutter; Set the robot tool
vOpSpeed.v_tcp:=Speed {WorkPointCount}; Setup robot cutting speed
vOpSpeed.v_ori:=Speed {WorkPointCount}; " "
MoveL pWorkingPos,vOpSpeed,zOpZone,tWorking\WObj:=wobjWorking; Robot moves to hole center point
StartTorch; Ignite the torch to pierce the material.
MoveC pWorkingPosC,pWorkingPos,vOpSpeed,zOpZone, tWorking\WObj:=wobjWorking;
Robot performs the circular motion to cut the hole
StopTorch; Turn off torch after the hole is cut
pAdjustPos:=CRobT(\Tool:=tWorking\WObj:=wobjWorking); Retract robot from cutting position
MoveL RelTool(pAdjustPos,0,0,25),vOpSpeed,fine, tWorking\WObj:=wobjWorking; " "

In some embodiments the computer readable products are referred to as cut charts. In some embodiments, the computer readable product (not shown), or cut charts, contains cutting information including instructions that select the plasma and shield gases. In some embodiments, the torch operator selects a cutting program that includes hole cutting parameter instructions. And in some embodiments an operator selects hole cut charts that are designed to execute consecutively with cutting program instructions for both hole cuts.

Figure 12:
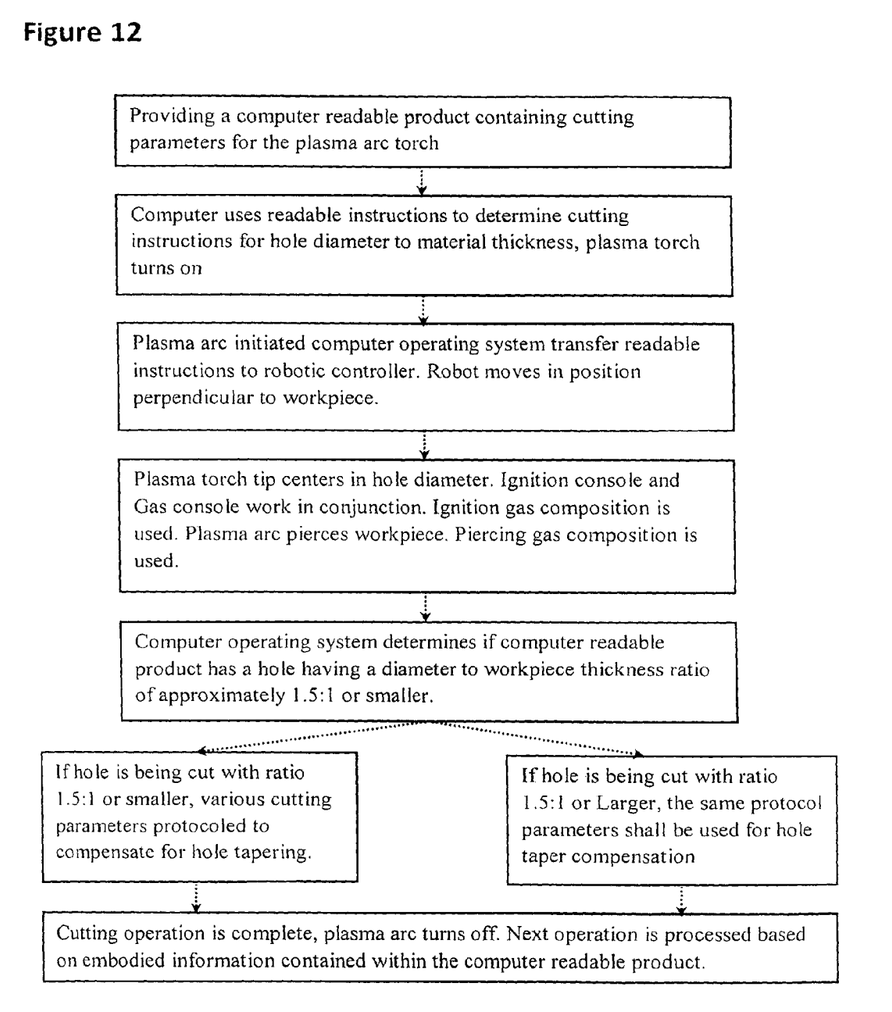
FIG. 12 is a flow diagram of the processes used.

FIG. 12 is a flow chart depicting how a processor, such as the computing operating system used in an arc torch system setup of the invention can implement principles of the invention. FIG. 12 shows an embodiment of the flow of operations that can be contained within a computer readable product which is embodied in an information carrier. A computer readable product is categorized as a drawing file with a file extension containing .DXF or .DSTV. In correlation with the computer readable product. Once the computer readable product is processed, a separate flow of operations is implemented to select the appropriate cut charts at, and instructions are delegated to the other components of the plasma arc torch system as previously mentioned in FIGS. 6 and 7, In some embodiments, once the computer operating system uses the computer readable instructions to determine if a hole is being cut, the torch is powered on and the arc is transferred to the workpiece. The ignition console receives operating instructions to select the correct shield and plasma gas compositions to create a stable cutting environment. After the arc is transferred to the workpiece, the torch is lowered to the workpiece and the plasma arc pierces through the center of the hole. During the piercing phase, the torch is generally stationary and the object is to make a penetration completely through the workpiece. Cutting, on the other hand, involves relative movement by the torch severing exposed edges to create the desired shape. In some embodiments, the duration of the pierce time is based on the dimensions of the hole diameter to the thickness of the workpiece ratio. In one embodiment illustrated in FIG. 10, if the ratio is of 1.5:1 or less, the appropriate cutting parameters that vary are protocoled to compensate for hole tapering is selected at 660. In another embodiment, if the hole to the thickness of the workpiece ratio is 1.5:1 or larger, the same parameters shall be used as the operating parameters used with the ratio consisting of 1.5:1. In both embodiments instructions for deciding to compensate for hole tapering, instructions regarding the highest quality cutting gas compositions are included in the cut charts. Once the appropriate cut chart is selected, the computer operating system (26) then relays instructions processed through the controller to position the torch tip perpendicular to the center of the hole to process the selected instructions.

When cutting a hole in a workpiece, the plasma torch is lowered to the workpiece, and the ignition console initiates the pierce arc in the workpiece. The torch tip will tilt from perpendicular and gradually bevel to the selected operating parameters, and adjust the protocoled torch tilt angle. The configured angle will stay at a constant angle throughout the circumference of the hole.

Figure 13:
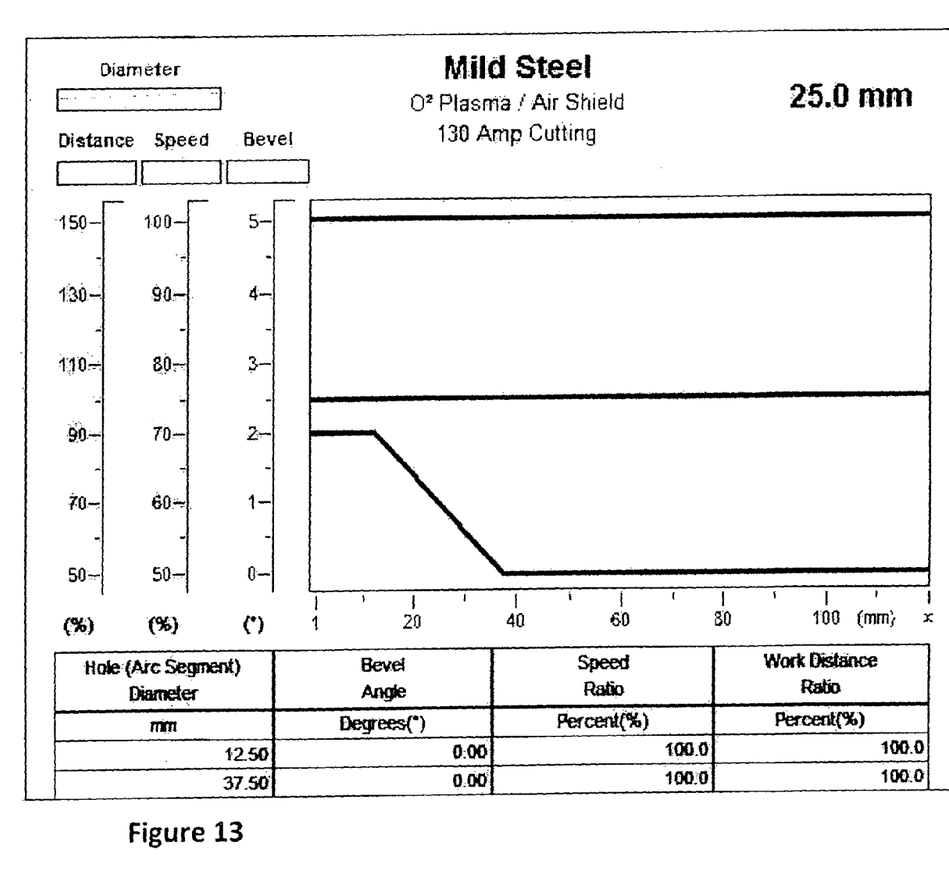
FIG. 13 is a screenshot of the user interface that the torch operator can verify or manually make changes to operating parameters.

FIG. 13 is an example of the user interface (34) that a torch operator can use to verify operating parameters, and wherein manual inputs to set different beveling angles to achieve a high quality bolt hole can be altered. Through the present invention input values in the user interface can be changed to reposition the torch tilt angle if the desired hole quality is not to satisfactory.

Figure 14:
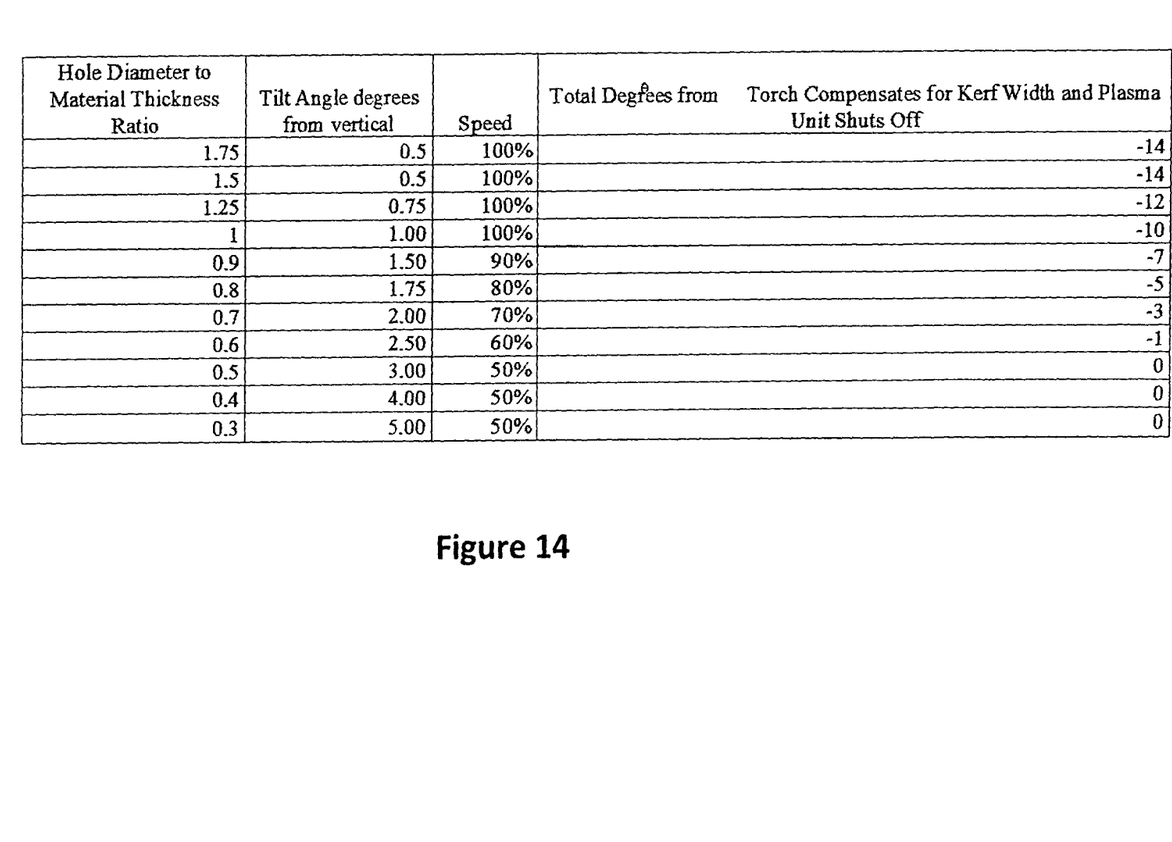
FIG. 14 is a table illustrating different operating parameters used to compensate for hole tapering.

FIG. 14 is a table illustrating examples of operating parameter combinations including; robot speed, torch angle, and degrees from theta the torch tip will differ from its true circular circumference of the hole. In one embodiment of the invention based on a hole in relation to material thickness having a ratio of 0.7:1 a set protocol of operating parameters is used.

As illustrated in the table of FIG. 14, after the plasma arc is initiated, it is transferred to the workpiece (S). Once the arc is transferred to the workpiece, the torch tilt angle is adjusted to 2 degrees through communication with the controller. A hole cut is begun in a workpiece (S) by first piercing the workpiece at (50) using the plasma arc then setting the robot speed to 70% of its safe operating parameters. Once the workpiece is pierced by the plasma arc, the torch will begin to translate across the workpiece along the hole cut instructions determined by the computer readable product. After completing 357 degrees of the hole, the plasma arc will commence a gradual inner curve (56) to achieve greater hole quality.

Figure 15B:
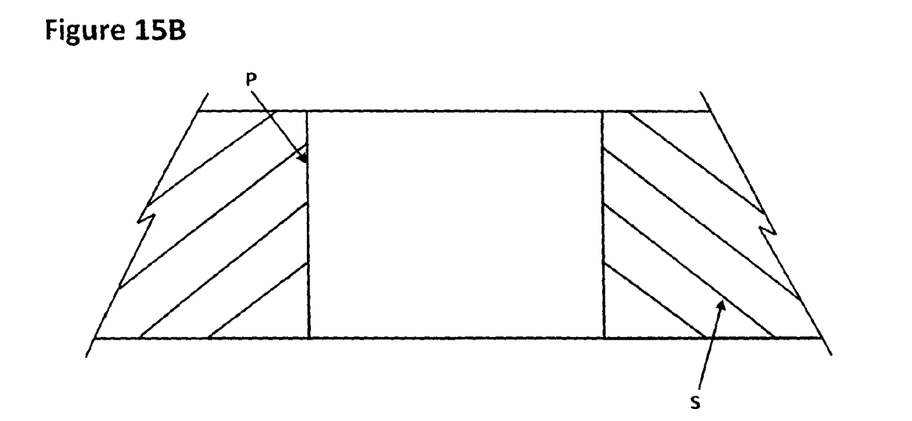
FIG. 15B is a cross sectional view of a hole cut with an embodiment of the Plasma jet process of the invention.

FIGS. 15A and 15B are examples of the cross section of a hole cut using a conventional plasma arc cutting method (15A) (Prior Art), in which the plasma torch was positioned perpendicular to the workpiece while a cylindrical path was cut. The "taper" or "bevel" can be measured, based on the examination of the top edge (60) of the hole in comparison to the bottom edge of the hole (62). The diameter of the hole on the top edge (60) of the workpiece (S) will be larger than the diameter of the hole on the bottom edge (62) of the workpiece. A bolt will not settle firmly in the hole. Where the torch cuts perpendicular to the workpiece a taper is created, thus required the need for a secondary process. For example in this instance, after a hole is processed the need for drilling or burrowing is required. Secondary processes are types of methods that are time consuming and undesirable.

FIG. 15B is a cross section of a hole cut with an embodiment of the present invention. It can be seen that the bevel or taper is compensated allowing an extrusion to be cut in a workpiece. The measurement on the topside of the workpiece will equal the diameter on the bottom side of the workpiece. With the bevel or taper of the edges of the hole, the tolerance zone between top and bottom is nonexistent resulting in a higher quality hole, without a secondary process needed.

Furthermore, by terminating the edge cutting path short of a complete 360 degrees, or a complete circumference of a non-circular hole, and by tracking the torch along an inward curve, the quality of the hole is further improved. This feature avoids prior problems caused by depressions or irregularities in the internal surface of the hole, which used to be encountered, when cutting a complete cut path.

While the invention has been particularly shown and described with reference to specific embodiments, other aspects of what is described herein can be implemented in cutting systems of ordinary skill in the art. It should be understood by those skilled in the art that various changes in form and detail can be made without departing from the spirit and scope of the invention as defined by the appended claims.

What is claimed is:

1. A process for the jet cutting of arcuate openings having a predetermined perimeter in a metal workpiece comprising the steps of;
   creating a high temperature plasma gas cutting jet at a jet nozzle and directing said jet along a predetermined axis, at a start point inside said perimeter;
   applying the cutting jet to the work piece, with the axis of the cutting jet offset from the perpendicular;
   moving said jet along a generally spiral cut path directed outwardly from the start point until it reaches said perimeter;
   moving the jet around to describe the cut path of the perimeter desired while maintaining the non perpendicular axis;
   terminating the plasma jet, at a preselected position when the jet is nearing completion of the cut path and prior to completion of the perimeter cut path; and,
   moving the jet nozzle on a path back in from the perimeter cutpath and directing it inwardly towards the start point.

2. The process as claimed in claim 1 Including the step of varying the angle of the jet axis depending on both the thickness of the metal, and the diameter of the opening.

3. The process as claimed in claim 2 including the step of increasing the intensity of the jet as the opening increases in depth by varying the gas pressure.

4. The process as claimed in claim 1 including the steps of compensating for hole taper by regulating the jet tilt angle.

5. The process as claimed in claim 4 including the steps of changing the jet angle, and moving the jet to gradually translate across the workpiece before completion of the hole and impeding the speed of the nozzle.

6. The process as claimed in claim 5 including controlling the plasma jet cutting parameters such that when the perimeter of the hole is breached the tilt angle of the jet maintains as a constant throughout completion of the hole.

7. The process as claimed in claim 1 including causing relative movement between the plasma jet and the workpiece to create a hole pierce originating from the center point of the hole, and wherein from that starting position the plasma jet gradually leads out to the circumference of the hole with the jet at an angle.

8. The process as claimed in claim 7 wherein when the jet is nearing completion of the hole the plasma jet will gradually lead back in from the circumference towards the center of the hole.

9. The process as claimed in claim 1 wherein the plasma torch cut through a workpiece contains two concentric cylinders with the diameter measurement on the topside of the workpiece equaling the diameter on the bottom side of the workpiece.

10. A process for the jet cutting an arcuate opening of a shape having a predetermined perimeter in a metal workpiece comprising;
    creating a cutting jet along a vertical axis;
    directing said jet at a starting point generally centrally of said shape
    piercing a hole through said workpiece at said starting point;
    moving said jet along a generally expanding spiral cutting path to reach the perimeter of said shape;
    tilting said axis of said jet offset from the perpendicular to compensate for taper;
    continuing to move said jet along a jet path around said perimeter to describe the shape desired while maintaining said non perpendicular jet axis; and,
    changing said jet path at a point just short of completion of said perimeter, to move said jet on a generally inward curved path, and terminating said jet.

* * * * *